Dec. 10, 1968  G. W. BROWN ET AL  3,415,105

APPARATUS FOR FORMING SHEET METAL CONTAINERS

Filed April 19, 1966  4 Sheets-Sheet 1

INVENTORS
GEORGE W. BROWN
CLARENCE W. BOXALL
BY
Meyer, Tilberry & Body

INVENTORS
GEORGE W. BROWN
CLARENCE W. BOXALL
BY
Meyer, Tilbury & Body

INVENTORS
GEORGE W. BROWN
CLARENCE W. BOXALL
BY
Meyer, Tilberry & Body

Dec. 10, 1968     G. W. BROWN ET AL     3,415,105
APPARATUS FOR FORMING SHEET METAL CONTAINERS
Filed April 19, 1966                    4 Sheets-Sheet 4

INVENTORS
GEORGE W. BROWN
CLARENCE W. BOXALL
BY
Meyer, Tilberry & Body

United States Patent Office 3,415,105
Patented Dec. 10, 1968

3,415,105
APPARATUS FOR FORMING SHEET METAL CONTAINERS
George W. Brown, Allestree, and Clarence W. Boxall, Eaton, England, assignors to E. W. Bliss Company, Canton, Ohio, a corporation of Delaware
Filed Apr. 19, 1966, Ser. No. 543,565
5 Claims. (Cl. 72—402)

ABSTRACT OF THE DISCLOSURE

A can beading machine which has a circular housing and a central opening adapted to receive a can body. Mounted in the housing is a circular slide carrier having a plurality of radially mounted tool slides which reciprocate towards and away from a can body in the can receiving opening. The slide carrier is rotatable within the housing so that the tool slides reciprocate along different lines of action relative to the can body surface, depending upon the configuration of the can. A circular cam plate is also provided within the housing having annular and arcuate cam slots which engage the tool slides. Rotary oscillating movement of the cam plate causes the tool slides to reciprocate radially in the tool slide carrier.

---

This invention relates to the art of can beading machines and more particularly, although not exclusively, to apparatus for beading sheet metal containers of flat sided configuration such as rectangular can bodies.

Although the invention will be described herein with reference to can beading machinery, it will be appreciated that it has much broader applications and is also applicable to other operations incident to the manufacture of can bodies such as seaming and flanging operations.

Sheet metal can bodies are commonly beaded to increase the strength of the sidewall. The beading is usually in the form of a series of grooves or fillets extending completely around the can body and is formed, either internally or externally, by locally deforming the sidewall. In the case of flat sided cans a prior art beading machine may comprise a rotary turret upon which are mounted a plurality of radially movable beading rolls. Can bodies are supported on a central nonrotatable chuck shaped to fit on the inside thereof. As the turret rotates, a cam groove controls the radial position of the beading rolls so that they roll on the outer surface of the can body and apply sufficient pressure to deform the metal and produce a circumferential bead. Such machines are not applicable however to various can shapes. For example, where the cam groove which moves the beading rolls against the can body is contoured for can bodies of one shape it cannot accommodate those of another shape.

These and other difficulties of a similar nature are overcome with the present invention which provides that the beading tools are reciprocally mounted for radial movement relative to the axis of the can and are also angularly adjustable to suit any configuration of the can.

In accordance with the invention, a machine for deforming flat sided cans is provided comprising a housing in which a plurality of reciprocal tool slides are mounted each having a line of action perpendicular to the can axis. A slide carrier is adapted for rotatable movement relative to the housing so as to position the tool slides to reciprocate along any desired angle radial to the axis of the can to follow a path angularly disposed to suit the configuration of the cam being deformed.

Further in accordance with the invention the radial movement of the tool slides is controlled by a circular cam plate and the line of action stroke length of the tool slides can be changed to accommodate cans having various major to minor side ratios merely by changing cam plates.

The principal object of the invention is to provide a can machine as referred to above in which the forming tools are capable of angular adjustment relative to the can body and thereby will accommodate straight sided can bodies of whatever configuration.

It is also an object of the invention, particularly where rectangular can bodies are involved, to provide lines of action for the tools which can be oriented with respect to the major and minor sides of the can body.

Another object where rectangular cans are beaded is to provide a machine in which the tool stroke is adjustable so as to be closable on a can body regardless of the major to minor side ratio thereof.

Another object of the invention is to provide a can beader of the type referred to which can be quickly and easily adjusted from one angular position to another with precision and without the need for special brackets, spacers or special beading heads for each particular can.

These and other objects will become apparent by referring to the following description and drawings wherein.

Figure 1:
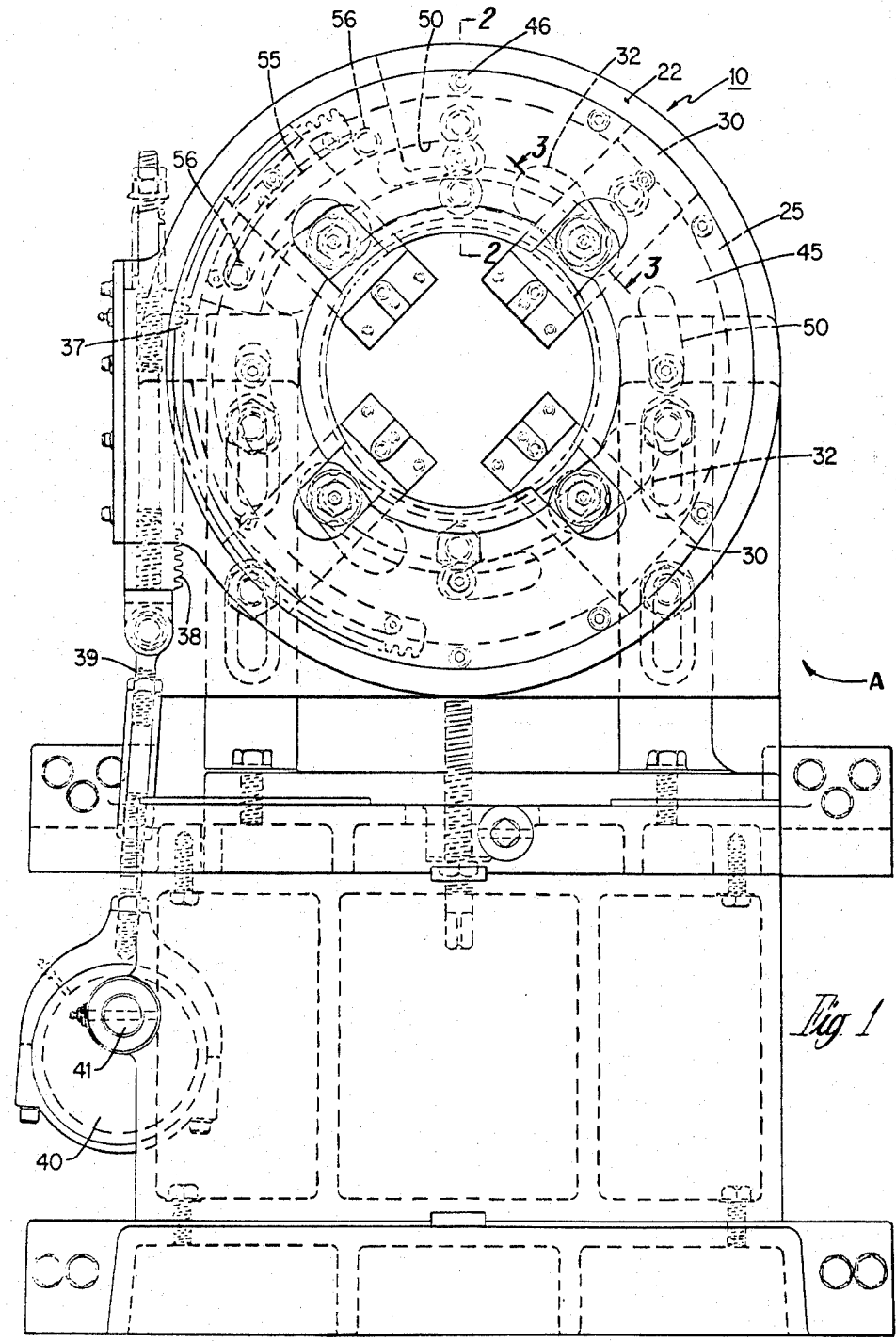
FIGURE 1 is a front elevation of apparatus constructed in accordance with the preferred embodiment of the invention.

Referring now to the drawings which are intended to illustrate a preferred embodiment of the invention only and not for the purpose of limiting same, FIGURE 1 is a front elevational view of a beading machine A which includes a beading head 10 having a central circular aperture 13 aligned with the direction of feed of can bodies upon which beading is required. Beading jaws shaped to suit the can body and bead required are mounted on the inner end of tool slide members 18 which are adapted to move radially inwardly simultaneously closing on the can body to form the beading thereon in cooperation with an expanding chuck (not shown) positionable on the interior of the can body.

Figure 4:
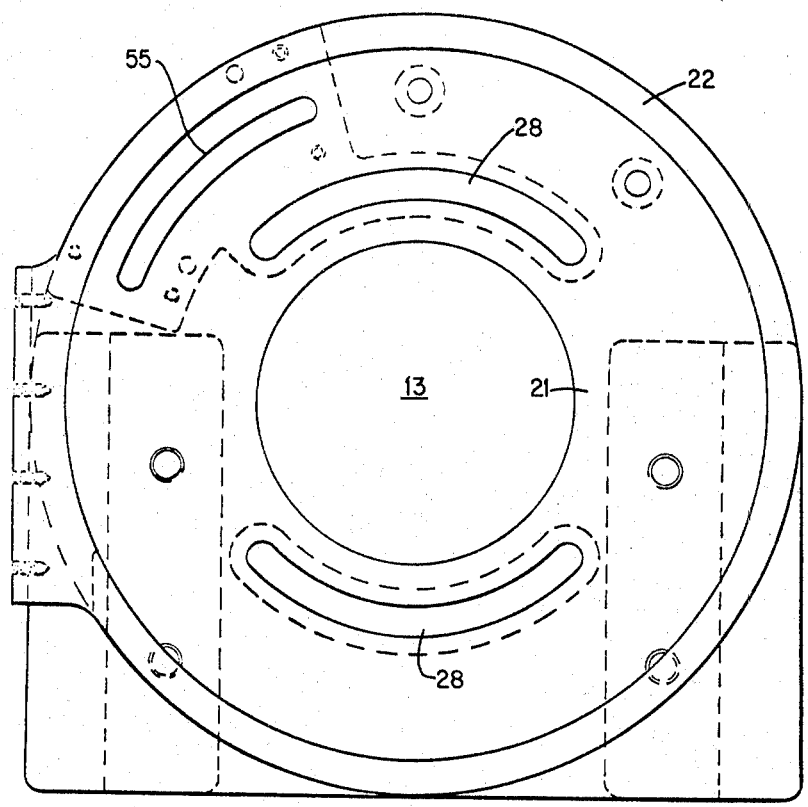
FIGURE 4 is a front elevation of the housing member of the apparatus.

In more detail and in accordance with the preferred embodiment of the invention, the beading head 10 comprising a housing member 21 (FIGURE 2) of circular configuration having a peripheral flange 22 defining the circular aperture 13. A tool slide carrier 24, the diameter of which is only slightly less than the internal diameter of the housing flange 22, is mounted within the latter and has a peripheral flange 25 positioned adjacent the housing flange 22. In accordance with the preferred embodiment of the invention, locking bolts 26 pass through diametrically opposed arcuate slots 28 (FIGURE 4) in the rear wall of housing 21 and are threaded into the rear wall of the tool slide carrier 24. By loosening locking bolts 26 the tool slide carrier 24 may be rotated in either direction within the housing 21 while the latter remains fixed relative thereto.

Figure 5:
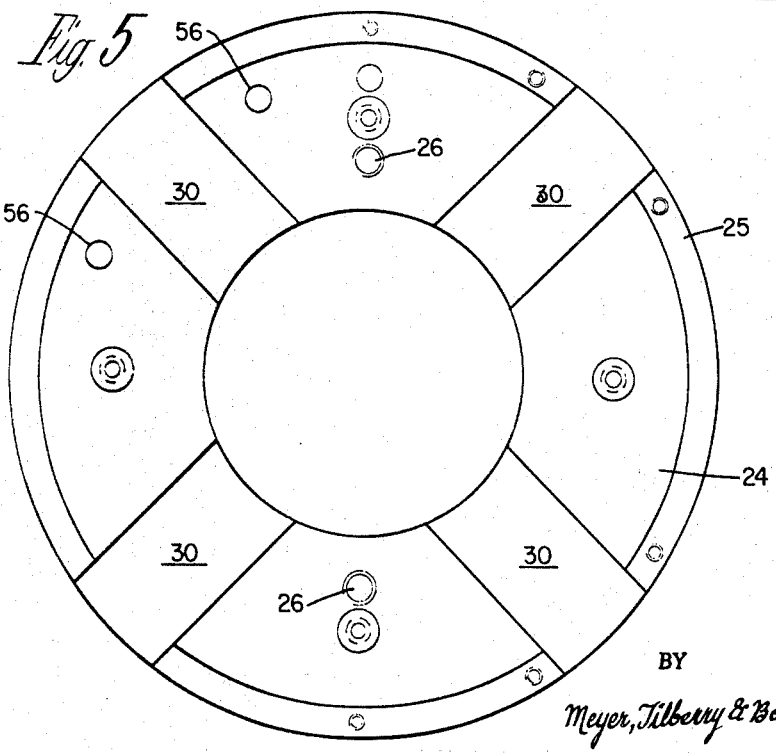
FIGURE 5 is a front elevation of the tool slide carrier of the apparatus.
Figure 6:
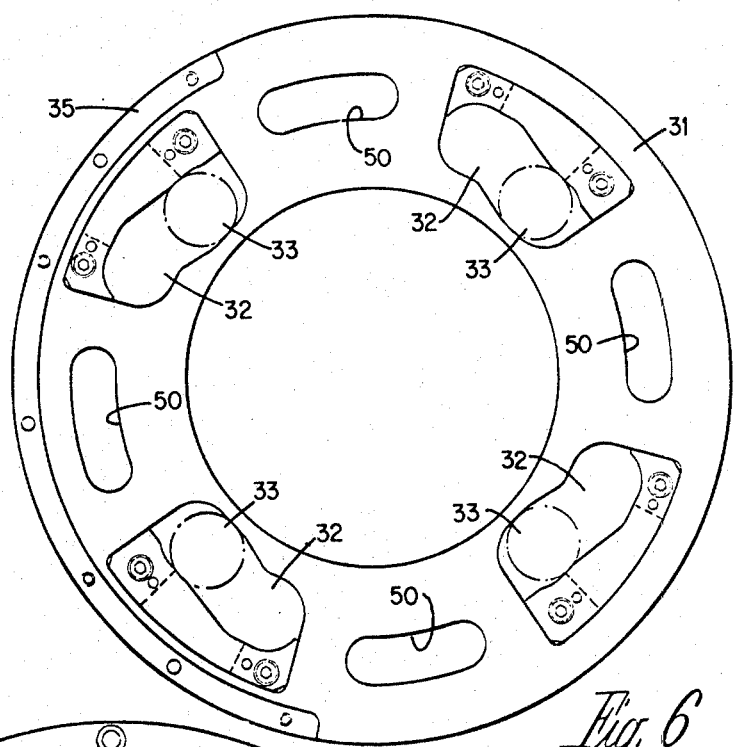
FIGURE 6 is a front elevation of the cam plate of the apparatus.

The tool slide carrier 24 has two pairs of diametrically opposed radially extending slots 30 (FIGURE 5) in each of which a slide member 18 is mounted and which is adapted for reciprocal movement radially to and from a position closing on the can body. This radial movement of the tool slide members 18 is effected by a circular plate 31 (FIGURE 6) having cam slots 32 formed therein each of which engages a roller 33 associated with each of the tool slide members 18 as shown in FIGURE 3. The circular cam plate 31 is mounted within the flange 25 of the tool slide carrier 24 as shown in FIGURE 2.

Referring again to FIGURES 1 and 6, the cam plate 31 has a recessed portion 36 adapted to mount a gear segment 37 which is engaged by a reciprocatory rack 38. The rack 38 is reciprocated by means of a rod 39 connected to an eccentric 40 which is associated with a drive shaft 41. Reciprocatory movement of the rack 38 is effective to impart oscillatory movement to the circular cam plate 31 which in turn causes slide members 18 to move radially to and fro in timed relationship in accordance with the feeding rate of can bodies.

Figure 2:
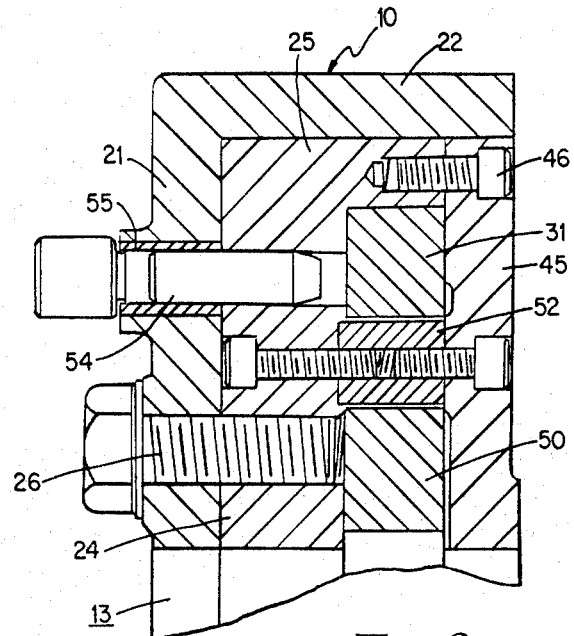
FIGURE 2 is a cross-sectional view taken along line 2—2 of FIGURE 1.
Figure 3:
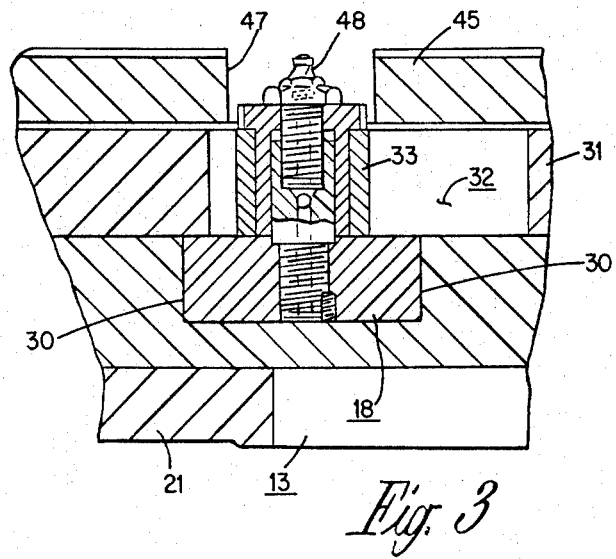
FIGURE 3 is a cross-sectional view taken along line 3—3 of FIGURE 1.
Figure 7:
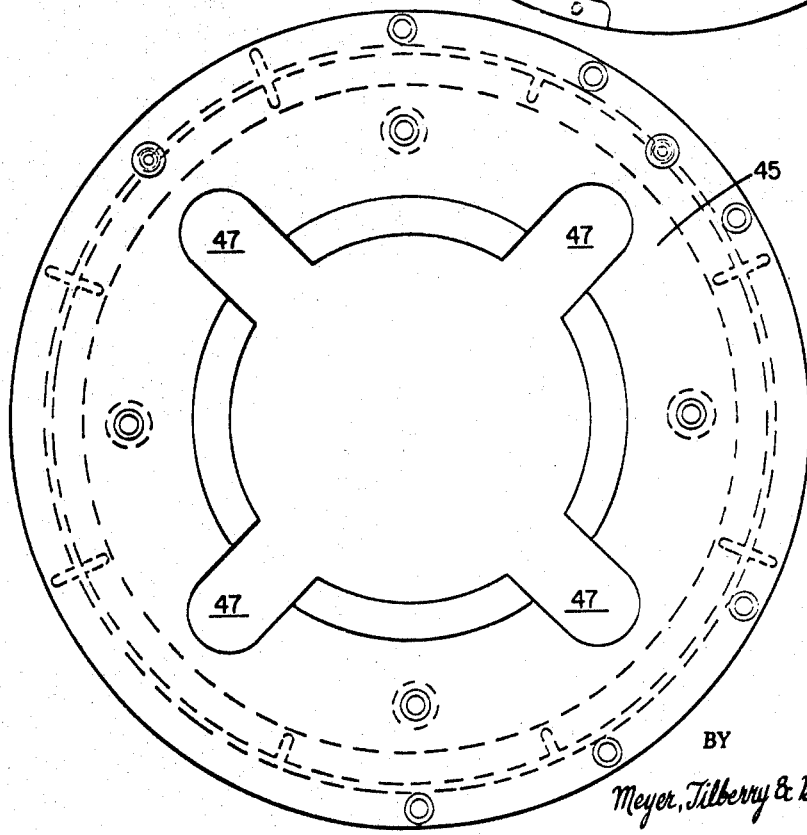
FIGURE 7 is a front elevation of the cover plate of the apparatus.

The tool slide carrier 24 and circular cam plate 31 are enclosed by cover plate 45 (FIGURE 7) which is connected to the tool slide carrier 24 by means of screws 46 as shown in FIGURE 2. The cover plate 45 has two pairs of diametrically opposed recesses 47 through which the ends of rollers 33 and associated grease nipples 48 protrude. The cam plate 31 has two pairs of diametrically opposed arcuate slots 50 (FIGURE 6) each of which is equally spaced between adjacent cam slots 32 and is adapted to receive cam plate carrier blocks 52 (FIGURE 2) which hold the spaced relationship of tool slide carrier 24 and cover plate 45 so as to accommodate the circular cam plate 31 therebetween without inhibiting its freedom of movement.

From the foregoing it will be seen that the tool slide carrier 24, cam plate 31 and cover plate 45 comprise a sub-assembly capable of limited angular displacement with respect to housing 21 and within which cam plate 31 is adapted to oscillate by the reciprocatory movement of rack 38. As provided in the preferred embodiment of the invention, a dowel pin 54 extends through an arcuate slot 55 in the rear wall of housing 21 and is received in one or two apertures 56 (FIGURE 2) angularly spaced at approximately 45° in the tool slide carrier 24 so as to limit the angular movement of the members 24, 31, 45.

In accordance with the invention, and particularly where rectangular can bodies are involved, it is necessary to line up the tool slides 18 with the respective major and minor axes of the can body. Also, a different line of action stroke is required for each different major to minor side ratio of the can. Normally this would require special brackets, spacers or even special beading heads for each particular can, however, with the invention the lines of action of the respective slides 18 can be angularly repositioned to accommodate the particular can configuration and the tool stroke can be quickly modified by changing cam plate 31. In operation, when repositioning the tool slide members 18, the rack 38 is first disengaged from the gear segment 37 and the bolts 26 are unlocked which enables the tool slide carrier 24, associated tool slide members 18, circular cam plate 31 and cover plate 45 to be moved through any required angle up to 90° so as to set the opposed pair of slide members 18 vertically and horizontally or at 45° to these positions. If various angles between these extremes are desired, a locating plate (not shown) may be positioned in the arcuate slot 55 to limit the angular displacement permitted. With the tool slide members 18 in the required position, the rack 38 is reengaged with the gear segment 37.

To vary the stroke length of the tool slides 18 the cover plate 45 is removed and cam plate 31 replaced with one having the proper cam slot contour.

It will be appreciated that the present invention may be used in conjunction with apparatus for reforming, seaming, flanging, or performing several operations on sheet metal can bodies where the object is to position the forming tool angularly with respect to the container being formed and to adjust the radial tool movement which encloses the can body in conformance with its particular shape and that various modifications may be made of obvious nature without departing from the invention as defined by the appended claims except insofar as limited by the prior art.

We claim:
1. Apparatus of the class described for deforming flat sided can bodies comprising
 a housing member defining a central can receiving space, an annular tool slide carrier mounted in the housing member angularly adjustable relative thereto,
 a plurality of tool slides mounted on said carrier being reciprocal relative to the can axis along lines of action extending radially inwardly toward the can receiving space,
 reciprocating means for reciprocating said tool slides in timed relationship,
 said reciprocating means comprising an annular cam plate angularly adjustable with said tool slide carrier in said housing member capable of oscillatory movement relative to the tool slide carrier including a plurality of arcuate cam slots connected with each tool slide effective to impart a reciprocatory movement to the tool slides with an oscillatory movement of said cam plate, and
 means to impart an oscillatory movement to said cam plate,
 said cam plate being removable from said housing and replaceable with different cam plates having different cam slots to vary the stroke of each tool slide.

2. Apparatus according to claim 1 wherein the can body being formed is essentially rectangular in cross sectional shape having major and minor sides thereto and the tool slide carrier includes two pairs of diametrically opposed tool slides reciprocal perpendicular to the can body axis and the cam plate includes two pairs of diametrically opposed cam slots, each pair being contoured to suit the major to minor side ratio of the can body.

3. A can beading machine for flat sided can bodies comprising an annular housing having an outer axially extending flange and a central circular opening defining a can body receiving space,
 an annular tool slide carrier mounted within the housing member having an outer axially extending flange adjacent the housing flange and a central circular opening surrounding said can receiving space and including at least one pair of diametrically opposed radially extending slots,
 faster means releasable to permit limited angular adjustment of the tool slide carrier relative to the housing member,
 a removable annular cam plate within said housing angularly adjustable with said slide carrier and slideably mounted on the tool slide carrier having at least one pair of diametrically opposed arcuate cam slots adjacent the radially extending slots in the tool slide carrier, said cam plate being capable of oscillatory movement relative thereto,
 a pair of tool slides receivable in the radially extending slots each having a cam roller receivable in one of the cam slots whereby oscillations of the cam plate are effective to cause reciprocation of the tool slides along lines of action extending radially from the can receiving space, and
 means to oscillate said cam plate.

4. A can beading machine according to claim 3 wherein the tool slide carrier includes two pairs of radially extending diametrically opposed slots each receiving a tool slide and said cam plate likewise includes two pairs of diametrically opposed cam slots adapted to receive the cam rollers of each tool slide.

5. A can beader machine as described in claim 4 wherein means are provided to precisely adjust the angular position of the tool slide carrier relative to the housing member through displacements of zero to ninety degrees in tool slide positions.

References Cited

UNITED STATES PATENTS

| | | | |
|---|---|---|---|
| 71,605 | 12/1867 | Gillinder | 72—401 |
| 265,679 | 10/1882 | Krutzsch | 72—402 |
| 391,825 | 10/1888 | Taylor | 72—402 |
| 1,493,515 | 5/1924 | Berthold | 72—402 |
| 1,912,821 | 6/1933 | Cameron | 72—401 |
| 2,790,188 | 4/1957 | Fray | 72—402 |
| 3,222,912 | 12/1965 | Specht | 72—402 |

CHARLES W. LANHAM, *Primary Examiner.*

E. M. COMBS, *Assistant Examiner.*

U.S. Cl. X.R.

72—399